(12) United States Patent
Pozgainer et al.

(10) Patent No.: US 9,090,156 B2
(45) Date of Patent: Jul. 28, 2015

(54) TIE ROD, PLASTIC TANK AND METHOD FOR MANUFACTURING A PLASTIC TANK

(71) Applicant: MAGNA STEYR Fuel Systems GesmbH, Sinabelkirchen (AT)

(72) Inventors: Günther Pozgainer, Graz (AT); Bernd Kahler, Graz (AT)

(73) Assignee: MAGNA STEYR Fuel Systems GesmbH, Sinabelkirchen (AT)

( * ) Notice: Subject to any disclaimer, the term of this patent is extended or adjusted under 35 U.S.C. 154(b) by 0 days.

(21) Appl. No.: 14/323,233

(22) Filed: Jul. 3, 2014

(65) Prior Publication Data

US 2015/0014307 A1 Jan. 15, 2015

(30) Foreign Application Priority Data

Jul. 10, 2013 (EP) .................................. 13175893

(51) Int. Cl.
*B60K 15/03* (2006.01)
*F17C 1/16* (2006.01)
*B65D 23/00* (2006.01)
*B65D 90/08* (2006.01)
*B29C 51/12* (2006.01)

(52) U.S. Cl.
CPC ..... *B60K 15/03006* (2013.01); *B60K 15/03177* (2013.01); *B65D 23/001* (2013.01); *B65D 90/08* (2013.01); *F17C 1/16* (2013.01); *B29C 51/12* (2013.01); *B60K 2015/03032* (2013.01); *B60K 2015/03039* (2013.01); *B60K 2015/03453* (2013.01); *Y10T 156/10* (2015.01); *Y10T 403/74* (2015.01)

(58) Field of Classification Search
CPC ...... B60P 3/221; B60P 3/2205; B65D 23/001
USPC .......................... 220/562, 651, 653, 654, 652
See application file for complete search history.

(56) References Cited

U.S. PATENT DOCUMENTS

| | | | | |
|---|---|---|---|---|
| 2,407,455 | A * | 9/1946 | Shakesby et al. | 220/653 |
| 3,368,708 | A * | 2/1968 | Pflederer | 220/590 |
| 3,774,812 | A | 11/1973 | Lemelson | |
| 5,813,566 | A * | 9/1998 | Bradford et al. | 220/653 |
| 6,135,306 | A * | 10/2000 | Clayton et al. | 220/564 |
| 6,138,859 | A * | 10/2000 | Aulph et al. | 220/563 |
| 6,338,420 | B1 * | 1/2002 | Pachciarz et al. | 220/562 |
| 7,455,190 | B2 * | 11/2008 | Potter et al. | 220/4.14 |
| 8,991,637 | B2 * | 3/2015 | Boecker et al. | 220/562 |
| 2002/0100759 | A1 * | 8/2002 | Schmidt et al. | 220/564 |
| 2005/0011891 | A1 * | 1/2005 | Austerhoff et al. | 220/4.12 |
| 2005/0016600 | A1 * | 1/2005 | Knaggs et al. | 137/590 |
| 2011/0168728 | A1 * | 7/2011 | McDermott et al. | 220/653 |
| 2012/0024868 | A1 * | 2/2012 | Menke | 220/653 |
| 2012/0138618 | A1 * | 6/2012 | Senn et al. | 220/652 |
| 2014/0158696 | A1 * | 6/2014 | Criel et al. | 220/562 |
| 2015/0014307 | A1 * | 1/2015 | Pozgainer et al. | 220/4.14 |

FOREIGN PATENT DOCUMENTS

WO 2012/139962 A1 10/2012

* cited by examiner

*Primary Examiner* — Steven A. Reynolds
*Assistant Examiner* — King M Chu
(74) *Attorney, Agent, or Firm* — Jordan IP Law, LLC; Todd A. Vaughn

(57) ABSTRACT

A tie rod for a plastic tank, in which the tie rod has end faces made of plastic and between the end faces has a central part made of a metal, a plastic tank having such a tie rod and a method for producing a plastic tank.

17 Claims, 4 Drawing Sheets

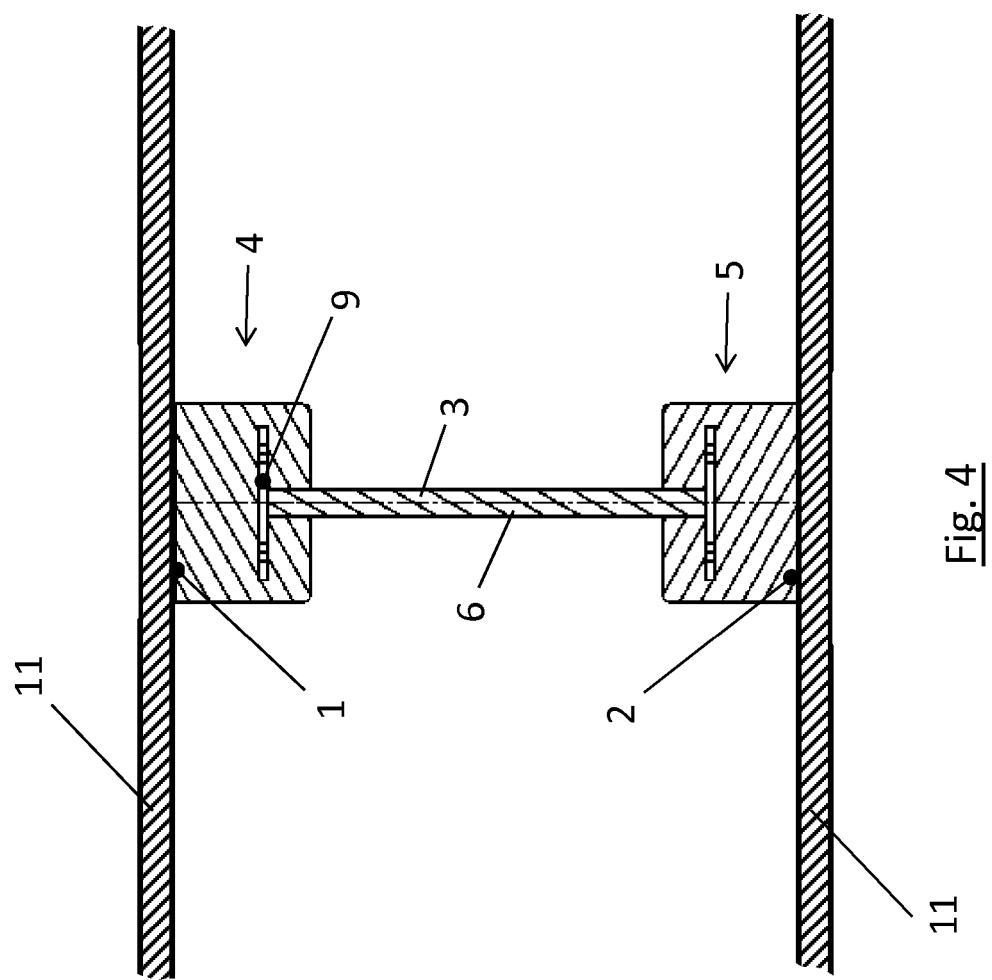

TIE ROD, PLASTIC TANK AND METHOD FOR MANUFACTURING A PLASTIC TANK

CROSS-REFERENCE TO RELATED APPLICATIONS

The present application claims priority 35 U.S.C. §119 to European Patent Publication No. EP13175893.0 (filed on Jul. 10, 2013), which is hereby incorporated by reference in its entirety.

TECHNICAL FIELD

Embodiments relate to a tie rod for a plastic tank, a plastic tank having such a tie rod and a method for producing such a plastic tank.

BACKGROUND

It is known to equip plastic tanks, in particular, pressurized plastic fuel tanks (DKKB), with tie rods for absorbing tensile forces acting on the tank shells. The tie rods are usually manufactured from the same material as the tank shells, in particular from high density polyethylene (HDPE). Tie rods made of HDPE may be sealed into the tank shells during the production of the latter and are therefore inexpensive to produce.

A tie rod made of plastic is known, for example, from U.S. Pat. No. 6,338,420 B1, which discloses a plastic fuel tank for a motor vehicle, comprising a hollow plastic vessel body with a base and a top side and a plastic strut in the hollow vessel body, the top foot of which is fusion bonded to the top side of the tank and the bottom foot of which is fusion bonded to the base of the tank.

FIGS. 1a to 1c illustrate a known tie rod. The tie rod is produced in one piece from a plastic material such as high density polyethylene (HDPE). The end faces 1 and 2 of the tie rod therefore likewise composed of HDPE and may be welded to a plastic tank. The central part 3 of the tie rod is an HDPE solid material.

Tie rods made solely of plastic, however, exhibit swelling behaviour under the action of fuel, however, and therefore, the tie rods and herewith also the plastic tanks are deformed over time.

SUMMARY

In accordance with embodiments, enhanced tie rods for plastic tanks, plastic tanks and a method for producing a plastic tank are provided, and particularly, tie rods having enhanced long-term properties under the action of fuel, which tend less toward deformation, which require little installation space and have a low weight and are easy to produce.

In accordance with embodiments, a tie rod for a plastic tank in which the tie rod has end faces made of a first material such composed of a plastic and between the end faces has a central part made of second material such composed of a metal.

Although, in accordance with embodiments, a tie rod has end faces made of a material such as a plastic, and may therefore be easily connected to the plastic tank, in particular may be welded to the tank shell of the plastic tank, the tie rod is, in accordance with embodiments, not manufactured continuously from plastic, but rather has a central part made of material such as a metal, which tends much less toward deformation under the action of fuel for a relatively long period of time than a corresponding plastic part.

In accordance with embodiments, a plastic tank has a tank shell made of plastic and at least one tie rod in accordance with embodiments. Here, the tank shell may be composed of a material such as HDPE.

In accordance with embodiments, a method for producing a plastic tank includes welding the end faces of the tie rod to a tank shell during the production of the tank shell. A particularly cost-effective production of a dimensionally stable plastic tank is thereby made possible.

Developments of embodiments are indicated in the dependent claims, the description and also the attached drawings.

In accordance with embodiments, the end faces may represent the terminations of end portions of the tie rods. In this respect, the end portions may be composed entirely of plastic, and in particular, the end portions and/or the end faces may be composed of the same plastic as the tank shell of the plastic tank. In particular, the plastic may be polyethylene, such as, for example, HDPE.

In accordance with embodiments, the central part of the tie rod is a metal bar. The metal bar may have a thin configuration and owing to this geometry displaces little tank volume, with good strength.

In accordance with embodiments, the central part is a metal tube having a plurality of openings. An internally hollow tube, when configured with openings such as slots, makes it possible for contents of the tank to be accommodated in the interior of the metal tube, and therefore little tank volume is displaced by the tie rod.

In accordance with embodiments, the end portions of the tie rod may be formed by perforated metal plates, which are encapsulated with plastic by injection moulding. This establishes a simple connection between the metal and the plastic of the tie rod and in the process ensures a low weight of the tie rod. A tie rod having end portions of this type may use a metal bar as the central part.

In accordance with embodiments, the end portions may be plastic injection mouldings. By way of example, the injection mouldings may be used together with a central part as a metal tube having openings. In this respect, the metal tube is preferably crimped onto the two end injection mouldings. The plastic injection mouldings may also have internal supporting sleeves made of metal for reinforcement.

In accordance with embodiments, a tie rod for a plastic tank may include at least one of the following: spaced apart end faces composed of a first material; and a central part extending between and connected to the end faces, the central part being composed of a second material which is different than the first material.

In accordance with embodiments, a tie rod for a tank may include at least one of the following: spaced apart end portions composed of a first material; and a central part extending between and connected to the end faces, the central part being composed of a second material which is different than the first material and includes a plurality of openings to permit a flow of a fluid from a region outside of tie rod into an interior of the central part.

In accordance with embodiments, a tank may include at least one of the following: a tank shell composed of a first material; and a tie rod having spaced apart end portions composed of a second material, and a central part extending between and connected to the end faces, the central part being composed of a third material which is different than the first material and the second material.

In accordance with embodiments, a method of producing a plastic tank may include at least one of the following: welding end faces of a tie rod to a tank shell during production of the tank shell, wherein the tank shell is composed of a first material, the tie rod includes a central part extending between and connected to the end faces which form an end portion which are spaced apart and composed of a second material, the central part being composed of a third material which is different than the first material and the second material.

DRAWINGS

Embodiments will be illustrated by way of example in the drawings and explained in the description below.

FIG. 1b illustrates a front view of the tie rod of FIG. 1a.

FIG. 2b illustrates a front view of the tie rod of FIG. 2a.

FIG. 3b illustrates a front view of the tie rod of FIG. 3a.

FIG. 4 illustrates a sectional view of part of a plastic tank having the tie rod of FIG. 2c in accordance with embodiments.

DESCRIPTION

Figure 1C:
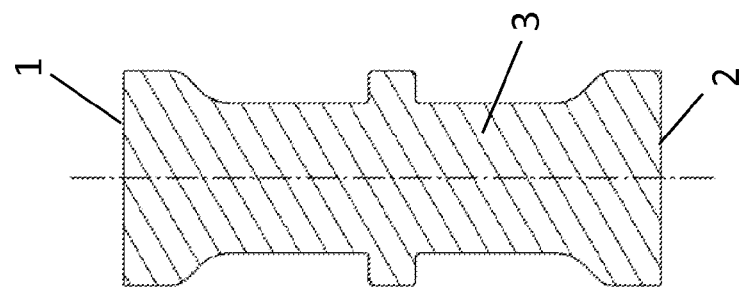
FIG. 1c illustrates a sectional view along A-A of the tie rod of FIG. 1b.
Figure 1B:
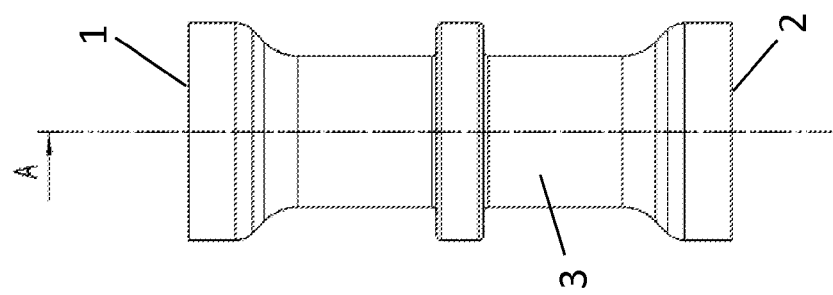
Figure 1A:
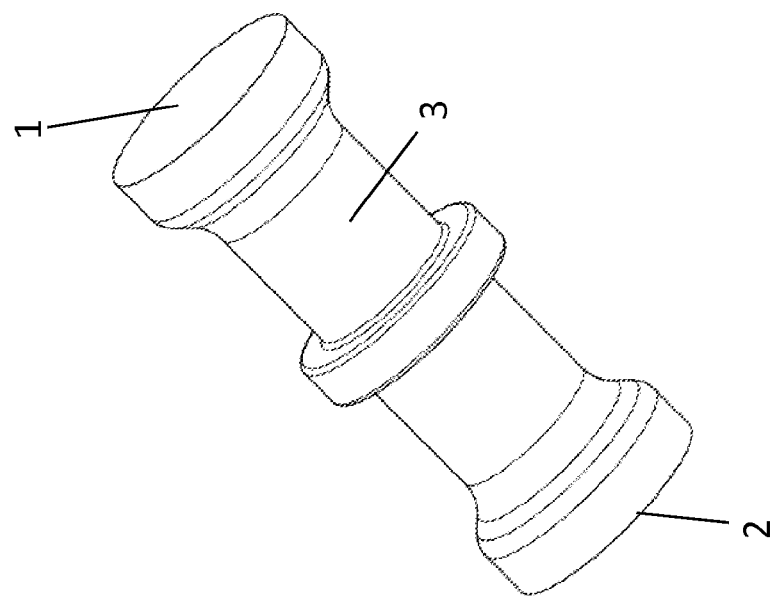
FIG. 1a illustrates a perspective view of a conventional tie rod.
Figure 2C:
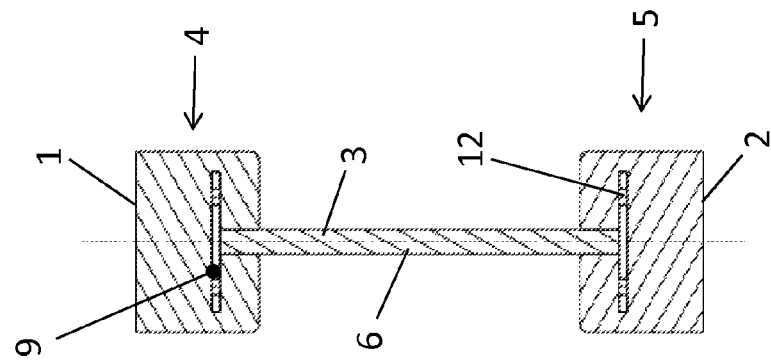
FIG. 2c illustrates a sectional view of along A-A of the tie rod of FIG. 2b.
Figure 2B:
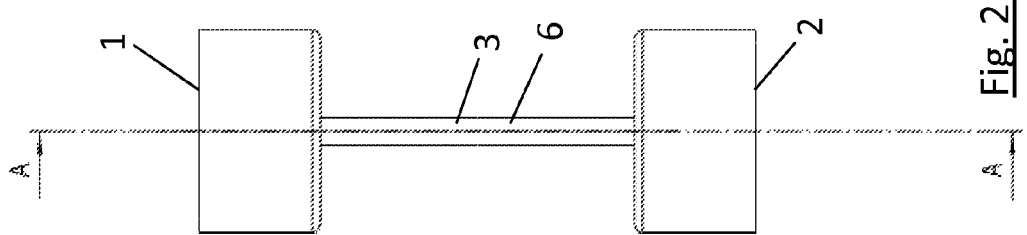
Figure 2A:
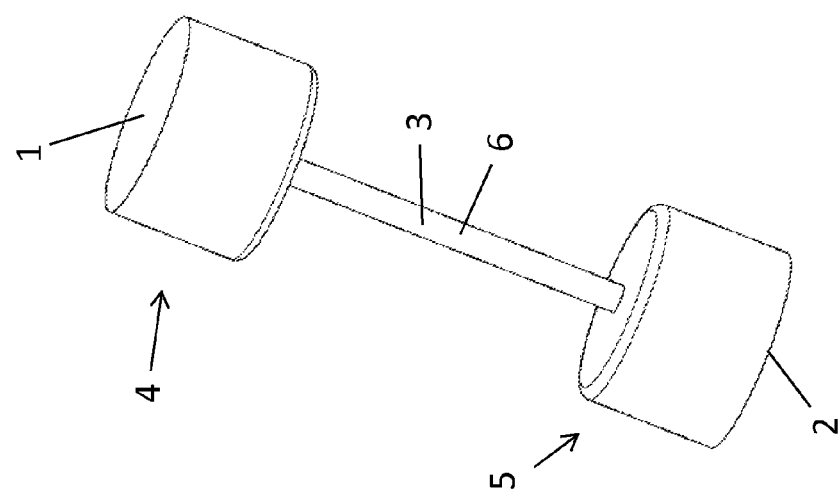
FIG. 2a illustrates a perspective view of a tie rod in accordance with embodiments.

FIGS. 2a to 2c illustrate a tie rod in accordance with embodiments. The tie rod has end faces 1, 2 made of a first material such as plastic and between the end faces 1, 2 has a central part 3 made of second material such as a metal. In the embodiment illustrated, use is made of a thin metal bar 6 as the central part 3, i.e., the diameter of the central part 3 is less than the diameter of the end faces 1, 2. The metal bar 6 has perforated metal plates 9 at both distal ends thereof. A plurality of holes 12 are distributed, for example, over the perforated metal plates 9 in a rotationally symmetrical manner. The perforated metal plates 9 are encapsulated with plastic by injection moulding, and therefore, in each case one perforated metal plate 9 and one plastic encapsulation together form an end portion 4, 5. The end faces 1, 2 of the end portions 4, 5 therefore are composed of a plastic material such as, for example, HDPE.

Figure 3A:
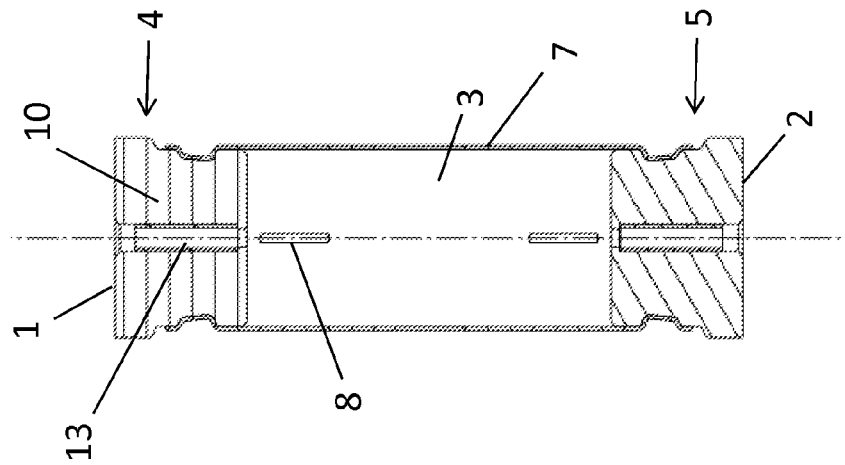
FIG. 3a illustrates a perspective view of a tie rod in accordance with embodiments.
Figure 3B:
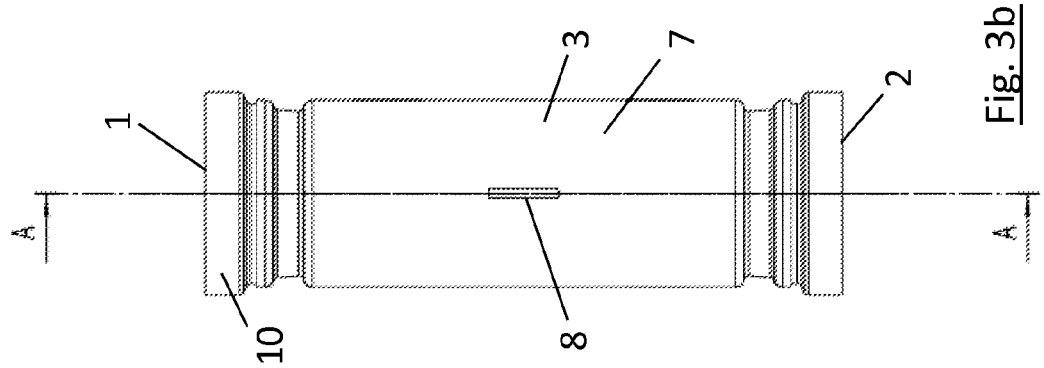
Figure 3C:
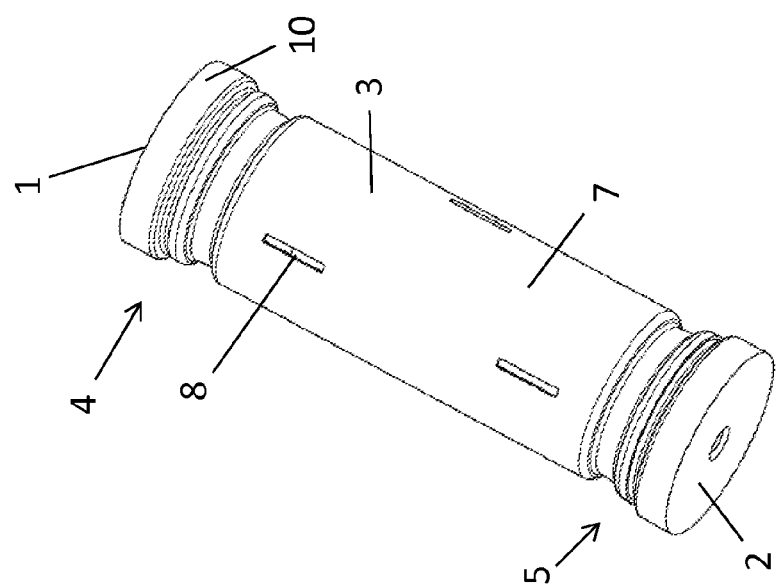
FIG. 3c illustrates a sectional view along A-A of the tie rod of FIG. 3b.

As illustrated in FIG. 3, a metal tube 7 having a plurality of openings 8 may be used as the central part 3. The openings 8 are in the form of slots extending along the longitudinal axis of the metal tube 7 and distributed circumferentially at differing positions on the metal tube 7. Accordingly, a fluid such as fuel may flow from a region outside of the metal tube 7 through the openings 8 and into the interior of the metal tube 7. Therefore the volume thereof displaces only little tank volume. Here, the end portions 4, 5 of the tie rod are in the form of HDPE injection mouldings 10 crimped onto the ends of the metal tube 7. For stiffening, the injection mouldings 10 may also have supporting sleeves 13 arranged in the centre of the injection mouldings.

As illustrated in FIG. 4, the tie rod of FIG. 2c is installed in a plastic tank. The plastic tank has an upper and a lower tank shell 11 made of a plastic such as HDPE. The end faces 1, 2 of the tie rod in accordance with embodiments may be connected via weld to the tank shell at both ends.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SIGNS

1 End face
2 End face
3 Central part
4 End portion
5 End portion
6 Metal bar
7 Metal tube
8 Opening
9 Perforated metal plate
10 Injection moulding
11 Tank shell
12 Hole
13 Supporting sleeve

What is claimed is:

1. A tie rod for a plastic tank, comprising:
spaced apart end faces composed of a first material; and
a central part extending between and connected to the end faces, the central part being composed of a second material which is different than the first material,
wherein the end faces form end portions which are composed entirely of plastic, and the end portions are formed by perforated metal plates which are encapsulated with plastic by injection moulding.

2. The tie rod of claim 1, wherein the first material is a plastic.

3. The tie rod of claim 2, wherein the plastic comprises high density polyethylene.

4. The tie rod of claim 1, wherein the second material is a metal.

5. The tie rod of claim 1, wherein the central part comprises a metal bar.

6. The tie rod of claim 1, wherein the first material is a plastic and the second material is a metal.

7. The tie rod of claim 1, wherein the central part has a diameter which is less than the diameter of each respective end portion.

8. A tank, comprising:
a tank shell composed of a first material; and
a tie rod having spaced apart end portions composed of a second material, and a central part extending between and connected to the end faces, the central part being composed of a third material which is different than the first material and the second material,
wherein the end faces form end portions which are composed entirely of plastic, and the end portions are formed by perforated metal plates which are encapsulated with plastic by injection moulding.

9. The tank of claim 8, wherein the first material and the second material is a plastic.

10. The tank of claim 8, wherein the second material comprises high density polyethylene.

11. The tank of claim 8, wherein the third material is a metal.

12. The tank of claim 8, wherein the central part comprises a metal bar.

13. The tank of claim 8, wherein the first material and the second material is a plastic and the third material is a metal.

14. The tie rod of claim 8, wherein the central part has a diameter which is less than the diameter of each respective end portion.

15. A method of producing a plastic tank, comprising:
welding end faces of a tie rod to a tank shell during production of the tank shell,
wherein the tank shell is composed of a first material, the tie rod includes a central part extending between and connected to the end faces which form an end portion which are spaced apart and composed of a second material, the central part being composed of a third material which is different than the first material and the second material,
wherein the end faces form end portions which are composed entirely of plastic, and the end portions are formed by perforated metal plates which are encapsulated with plastic by injection moulding.

16. The method of claim 15, wherein the first material and the second material is a plastic and the third material is a metal.

17. The method of claim 15, wherein the second material comprises high density polyethylene.

* * * * *